(12) United States Patent
Takazane et al.

(10) Patent No.: US 11,156,506 B2
(45) Date of Patent: Oct. 26, 2021

(54) SELF-LUMINOUS DISPLAY DEVICE

(71) Applicant: SHARP KABUSHIKI KAISHA, Sakai (JP)

(72) Inventors: Yohichi Takazane, Sakai (JP); Keisuke Hamajima, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/142,782

(22) Filed: Jan. 6, 2021

(65) Prior Publication Data
US 2021/0231505 A1 Jul. 29, 2021

(30) Foreign Application Priority Data
Jan. 23, 2020 (JP) .............................. JP2020-009379

(51) Int. Cl.
*G01K 7/24* (2006.01)
*G09G 3/3266* (2016.01)

(52) U.S. Cl.
CPC ............. *G01K 7/24* (2013.01); *G09G 3/3266* (2013.01); *G09G 2300/02* (2013.01); *G09G 2320/041* (2013.01)

(58) Field of Classification Search
CPC ...... G09G 3/3266; G09G 3/30; G09G 3/3208; G09G 3/3258; G09G 3/3225; G01K 7/24; G01K 7/22
See application file for complete search history.

(56) References Cited

U.S. PATENT DOCUMENTS

| | | | |
|---|---|---|---|
| 9,142,157 B2* | 9/2015 | Wurzel | G06F 1/206 |
| 9,647,661 B2* | 5/2017 | Cui | G09G 3/3696 |
| 10,672,337 B2* | 6/2020 | Tanaka | G09G 3/3233 |

FOREIGN PATENT DOCUMENTS

JP 2010282775 A 12/2010

* cited by examiner

*Primary Examiner* — Sardis F Azongha
(74) *Attorney, Agent, or Firm* — ScienBiziP, P.C.

(57) ABSTRACT

A self-luminous display device comprises a display panel including self-luminous elements that are arranged in a row direction and in a column direction and that are scanned in the column direction from a first end toward a second end; and a flexible unit that is connected to the second end of the display panel in the column direction, that bends, and that extends along the display panel, wherein the flexible unit includes a thermistor that detects a temperature of the display panel, and wherein the flexible unit includes a detour portion that is equipped with the thermistor on a portion that extends in the row direction, that detours, and that extends toward the second end in a plan view.

7 Claims, 11 Drawing Sheets

SELF-LUMINOUS DISPLAY DEVICE

BACKGROUND

1. Field

The present disclosure relates to a self-luminous display device.

2. Description of the Related Art

In an organic EL device that is known as an existing technique, organic EL (Electro-Luminescence) elements and a light-shielding portion (a temperature-detecting unit) that detects temperature near the organic EL elements are disposed in a display region of a display panel (Japanese Unexamined Patent Application Publication No. 2010-282775). The temperature-detecting unit detects the temperature of the display region by detecting the temperatures of pixels and enables a high-quality image to be displayed without a color shift.

When a leak due to external damage or a foreign substance, for example, occurs at a time during scanning in a display device including a display panel including OLEDs (Organic Light Emitting Diodes) that are arranged in a row direction and in a column direction and that are scanned in the column direction from a first end toward a second end, display data to be stored in a self-luminous element and a control signal for controlling the light emission of the self-luminous element cease in a display region after the time during scanning. In this case, a large current flows through light-emitting elements that are arranged in the display region after the time during scanning, and anomalous light emission occurs. For this reason, there is a concern that a user touches the display region that is in a high-temperature state as a result of heat generation due to the anomalous light emission of the light-emitting elements and is burnt.

A fail-safe method that can be considered to ease the concern involves connecting a thermistor that detects the high-temperature state of the display panel to the second end of the display panel in the column direction and disposing the thermistor on a flexible unit that bends and extends along the display panel.

The flexible unit includes a chip-on-film (COF) that is equipped with a driver for driving the self-luminous element, that is connected to the second end of the display panel, and that extends along the display panel, and a flexible printed circuit (FPC) that is joined to the COF and that extends along the display panel.

The COF that is equipped with the driver has dimensions such as width that are standardized depending on the dimensions of the driver and needs a special order if the dimensions are changed to include the thermistor. Accordingly, it is difficult for the COF to include the thermistor because of problems such as a restriction on area and increase in costs. There is also a concern that it is difficult for the COF that includes the thermistor to accurately detect the temperature of the display panel because heat that is generated from the driver is directly conducted to the thermistor.

In view of this, it can be considered that the thermistor that detects the temperature of the display panel is disposed on the FPC that is joined to the COF.

In the case where the thermistor is disposed on the FPC that is joined to the COF, however, the anomalous light emission occurs on only several lines from the final scanning line at the second end when the leak due to the external damage or the foreign substance, for example, occurs near the second end of the display panel in the column direction. For this reason, there is a concern that it takes a long time until heat based on the anomalous light emission that occurs on the several lines from the final scanning line at the second end reaches the thermistor that is disposed on the FPC that is joined to the first end of the COF in the column direction of the display panel, or the heat based on the anomalous light emission does not reach the thermistor. Accordingly, there is a problem in that the thermistor does not detect increase in the temperature of the display panel.

It is desirable to provide a self-luminous display device that can readily detect increase in the temperature of a display panel even when the anomalous light emission of self-luminous elements occurs on several lines from the final scanning line.

SUMMARY

According to an aspect of the disclosure, a self-luminous display device includes a display panel including self-luminous elements that are arranged in a row direction and in a column direction and that are scanned in the column direction from a first end toward a second end, and a flexible unit that is connected to the second end of the display panel in the column direction, that bends, and that extends along the display panel. The flexible unit includes a thermistor that detects a temperature of the display panel. The flexible unit includes a detour portion that is equipped with the thermistor on a portion that extends in the row direction, that detours, and that extends toward the second end in a plan view.

DESCRIPTION OF THE EMBODIMENTS

First Embodiment

Figure 1:
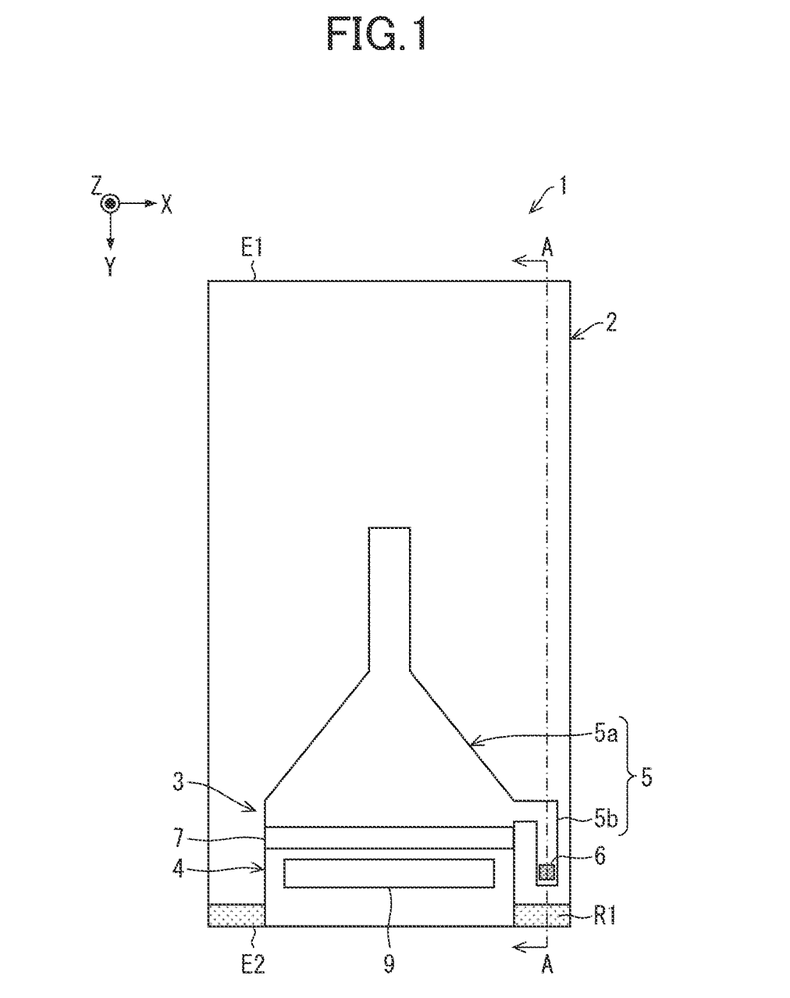
FIG. 1 is a rear view of a display panel and a flexible unit in a self-luminous display device according to a first embodiment.
Figure 2:
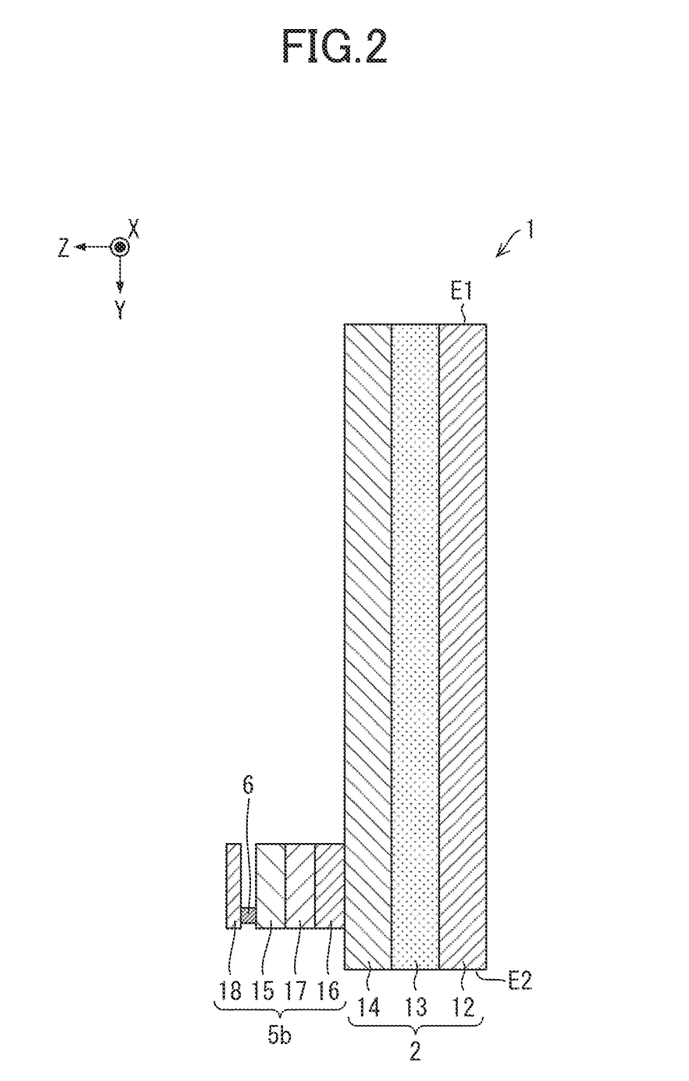
FIG. 2 is a sectional view taken along line A-A illustrated in FIG. 1.
Figure 3:
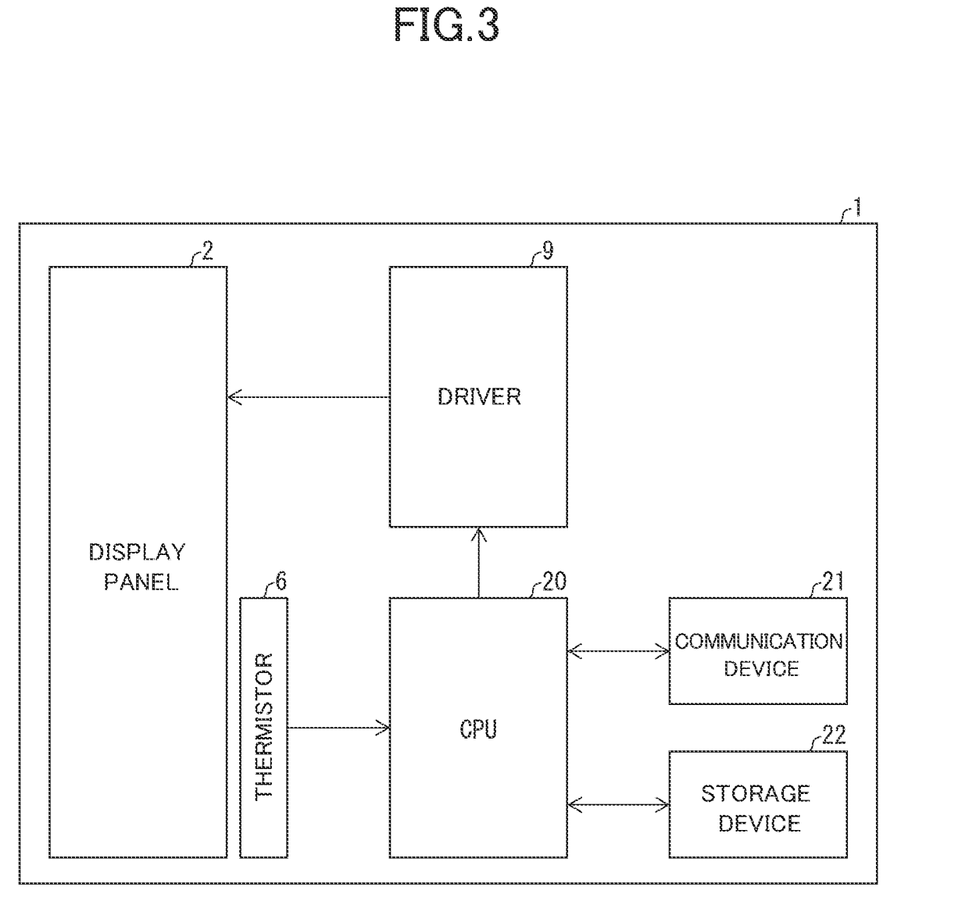
FIG. 3 is a block diagram of the self-luminous display device.

An embodiment of the present disclosure will now be described in detail. FIG. 1 is a rear view of a display panel 2 and a flexible unit 3 in a self-luminous display device 1 according to a first embodiment. FIG. 2 is a sectional view taken along line A-A illustrated in FIG. 1. FIG. 3 is a block diagram of the self-luminous display device 1.

The self-luminous display device 1 includes the display panel 2 including OLEDs (self-luminous elements) that are arranged in an X-direction (a row direction) and in a Y-direction (a column direction) and that are scanned in the Y-direction from a first end E1 toward a second end E2, and the flexible unit 3 that is connected to the second end E2 of the display panel 2, that bends, and that extends along the display panel 2. The self-luminous display device 1 can be, for example, a mobile terminal such as a smartphone (an abbreviation "Sumaho" in Japanese).

The flexible unit 3 may include a COF 4 that is equipped with a driver 9 for driving the OLEDs that are arranged in the display panel 2, that is connected to the second end E2 of the display panel 2, and that extends along the display panel 2, a FPC 5 that is joined to the COF 4 and that extends along the display panel 2, an ACF 7 for joining the COF 4 and the FPC 5 to each other by thermo-compression bonding, and a thermistor 6 that detects the temperature of the display panel 2.

The FPC 5 may include a body 5a and a detour portion 5b that is equipped with the thermistor 6 at a portion that detours around the COF 4 and that extends toward the second end E2 in a plan view. The detour portion 5b may detour around the ACF 7 and may extend toward the second end E2. The detour portion 5b may be equipped with the thermistor 6 at a position nearer than the ACF 7 to the second end E2 in a plan view.

The display panel 2 includes an OLED portion 13 in which the OLEDs are arranged, a cover glass (CG) portion 12 that is formed in the front of the OLED portion 13, and an SF portion 14 that contains a high-thermal-conductivity material and that is formed behind the OLED portion 13 to cause heat to disperse and to escape rapidly.

The FPC 5 is formed so as to extend with the FPC 5 being in contact with the display panel 2 behind the display panel 2. The FPC 5 includes a base 15, a cover-lay 16 that is formed such that the cover-lay 16 is in contact with the SF portion 14 of the display panel 2 at a position nearer than the base 15 to the display panel 2, a copper portion 17 that is formed between the cover-lay 16 and the base 15, and a cover portion 18 that is on the opposite side of the base 15 from the display panel 2.

The self-luminous display device 1 further includes a CPU (Central Processing Unit) 20, a communication device 21, and a storage device 22. The CPU 20 controls the operation of the driver 9 for driving the self-luminous elements that are arranged in the display panel 2, based on the temperature of the display panel 2 that is detected by the thermistor 6. The communication device 21 transmits and receives data for, for example, an image that is displayed on the display panel 2 via, for example, an external computer network. The storage device 22 stores the data for, for example, the image that is displayed on the display panel 2. The CPU 20 controls the operation of the communication device 21 and the storage device 22.

Figure 4:
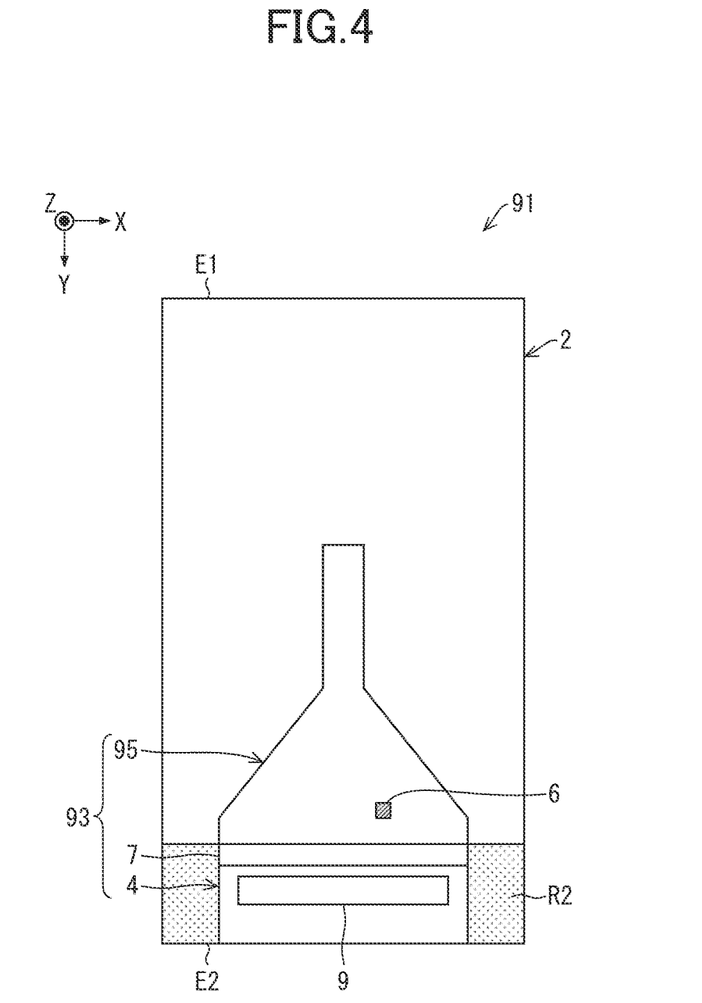
FIG. 4 is a rear view of the display panel and a flexible unit in a self-luminous display device in a comparative example.

FIG. 4 is a rear view of the display panel 2 and a flexible unit 93 in a self-luminous display device 91 in a comparative example. Components like to the components described above are designated by like reference characters, and a detailed description thereof is not repeated.

In the self-luminous display device 91 in the comparative example, a FPC 95 that is located opposite the second end E2 with respect to the COF 4 is equipped with the thermistor 6.

In the case where a gate wiring line that is connected to the driver 9 to supply display data for the light emission of the OLEDs and/or a control wiring line through which a control signal for controlling the light emission of the OLEDs is supplied is damaged in the display panel 2 in a scanning method, an OLED that is nearer than a scanning line under scanning at the time of the damage to the second end E2 gets into an anomalous light emission state due to an excess current that flows therethrough, and a region that is nearer than the scanning line to the second end E2 becomes an anomalous light emission region R1 or R2. In the anomalous light emission region R1 or R2, heat is generated because the excess current flows through the OLEDs.

The thermistor 6 of the self-luminous display device 91 in the comparative example illustrated in FIG. 4 is located away from the final scanning line. Accordingly, in the case where the gate wiring line and/or the control wiring line is damaged at a position relatively far from the final scanning line, heat generation from the anomalous light emission region R2 that extends from the second end E2 and that has an area of about 30% of the entire area can be detected. However, it is difficult to detect heat generation from the anomalous light emission region R1 in the case where the anomalous light emission of the OLEDs occurs on several lines from the final scanning line.

The thermistor 6 of the self-luminous display device 1 according to the first embodiment illustrated in FIG. 1, however, is located near the final scanning line. This ensures detection of the heat generation from the anomalous light emission region R1 that has a width of about 1 cm from the second end E2 in the case where the anomalous light emission of the OLEDs occurs on the several lines from the final scanning line.

The thermistor 6 detects the temperature of the display panel 2 while the driver 9 drives the OLEDs of the display panel 2. When abnormal temperature is detected, detection is retried multiple times so as not to be misdetection, and the CPU 20 shutdowns the driving of the OLEDs by using the driver 9 when abnormal temperature is still detected.

Figure 5:
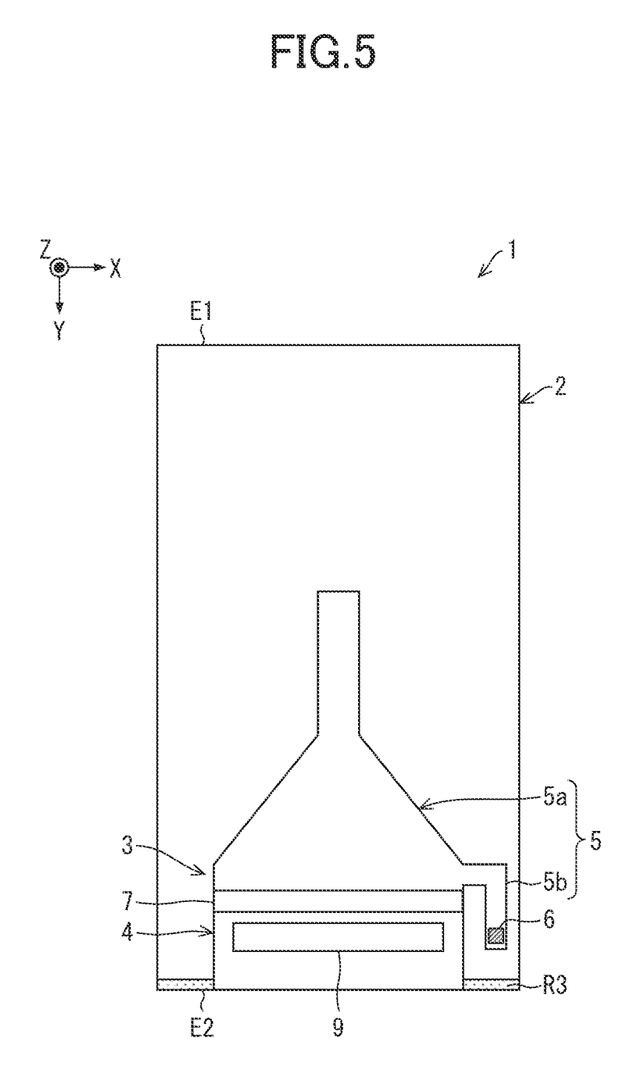
FIG. 5 is a rear view in the case where the anomalous light emission region of the display panel is very small.

FIG. 5 is a rear view in the case where the anomalous light emission region of the display panel 2 is very small. Components like to the components described above are designated by like reference characters, and a detailed description thereof is not repeated.

In the case where the anomalous light emission occurs in a very narrow region near the second end E2 of the display panel 2 such as the anomalous light emission region R3, the hear generation of the display panel 2 and heat dissipation from the display panel 2 to the outside are balanced, and there is almost no problem with the heat generation of the display panel 2.

The thermistor 6 may be located at a position a predetermined distance away from the second end E2. The predetermined distance is preferably a distance of about 10% of the dimension of the display panel 2 in the Y-direction. For example, the distance is preferably about 1 cm. The reason is that there is a possibility that the second end E2 of the display panel 2 and a cabinet frame into which the display panel 2 is incorporated come into contact with each other when the thermistor 6 is located substantially at the second end E2. Another reason is that in the case where the anomalous light emission occurs in a very narrow region such as the anomalous light emission region R3, the heat that is generated by the display panel 2 does not reach a temperature that can be detected by the thermistor 6 because of the heat dissipation from the display panel 2 to the outside. Specifically, the reason is that the thermistor 6 is disposed on a surface of the display panel 2 at the second end E2 that adheres to the cabinet frame, and the incorporation of the display panel 2 into the cabinet is impeded by the thermistor 6.

In an example described according to the first embodiment, two films of the COF 4 and the ACF 7 are used. The present disclosure, however, is not limited thereto. The flexible unit 3 may include a single common substrate film. The same is true for embodiments described later.

The position of the thermistor 6 is thus nearer than that in the comparative example to the anomalous light emission region R1 of a heat source, and the anomalous light emission on the several lines from the final scanning line can be detected with certainty.

Second Embodiment

Another embodiment of the present disclosure will now be described. For convenience of description, a component that has the same function as that of a component described according to the above embodiment is designated by a like reference character, and a description thereof is not repeated.

Figure 6:
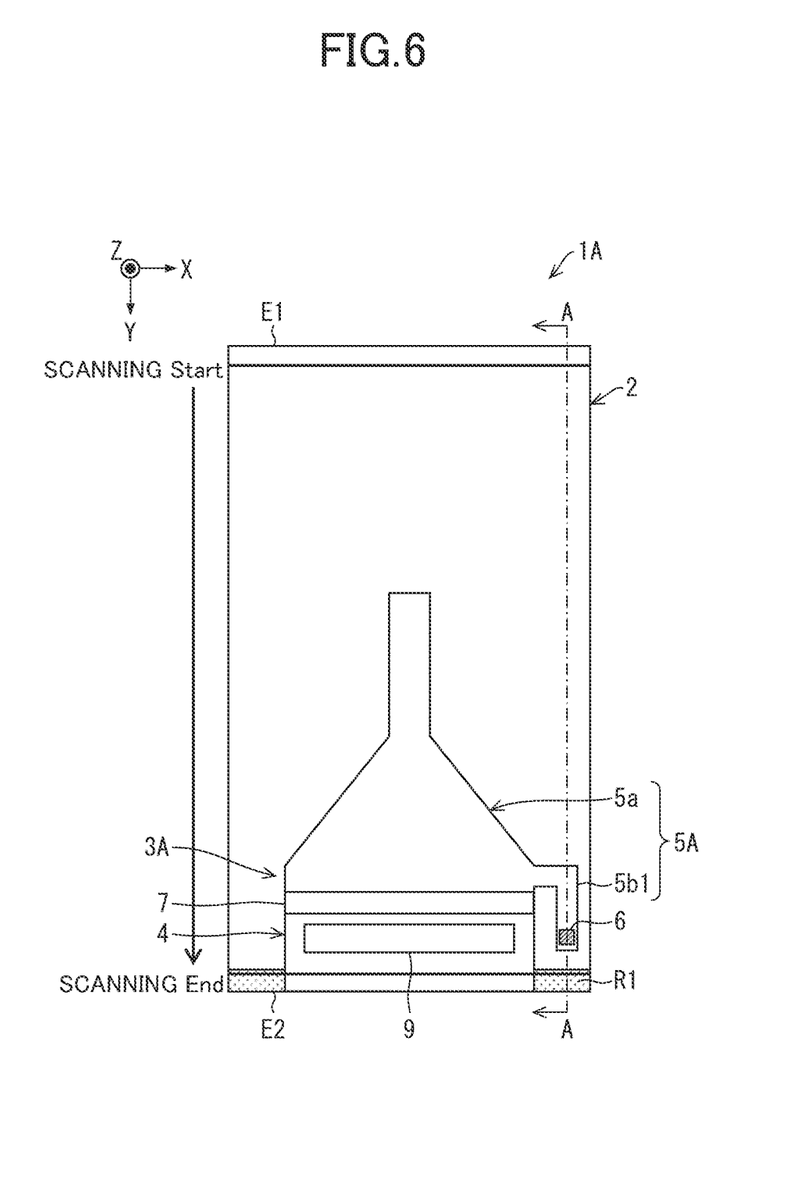
FIG. 6 is a rear view of the display panel and a flexible unit in a self-luminous display device according to a second embodiment.
Figure 7:
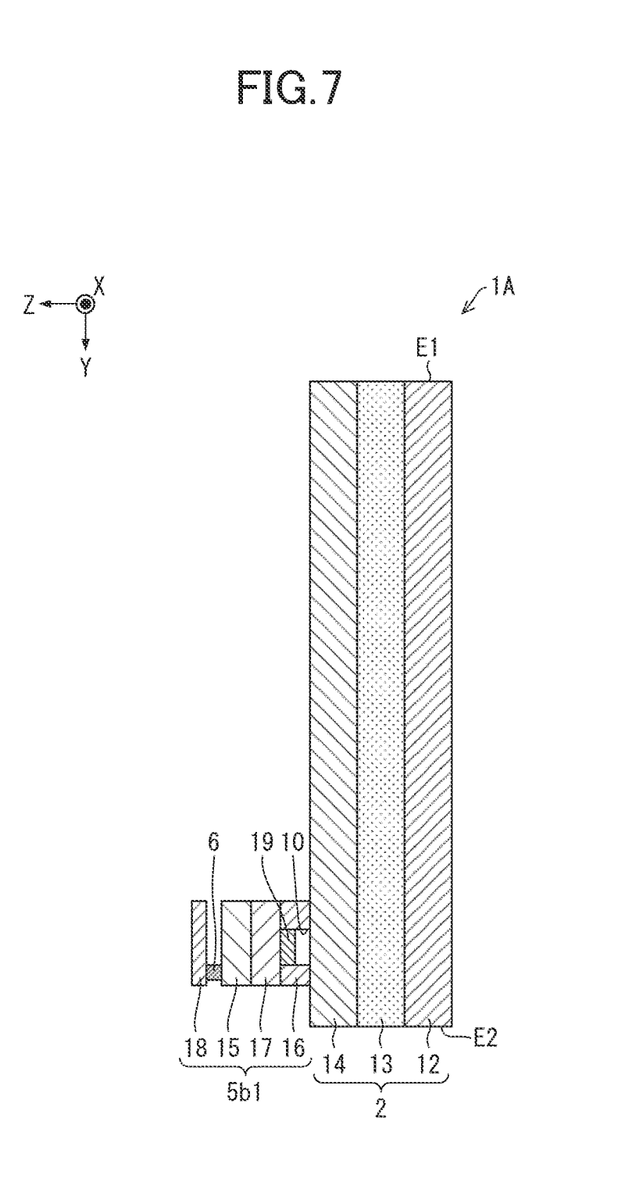
FIG. 7 is a sectional view taken along line A-A illustrated in FIG. 6.

FIG. 6 is a rear view of the display panel 2 and a flexible unit 3A in a self-luminous display device 1A according to a second embodiment. FIG. 7 is a sectional view taken along line A-A illustrated in FIG. 6. Components like to the components described above are designated by like reference characters, and a detailed description thereof is not repeated.

The flexible unit 3A includes a FPC 5A, the COF 4, and the ACF 7. The FPC 5A includes a body 5a and a detour portion 5b1. The thickness of the detour portion 5b1 may be less than the total thickness of the thickness of the ACF 7, the thickness of the COF 4, and the thickness of the body 5a of the FPC 5A.

In a process of thermo-compression bonding of the FPC 5A and the COF 4 by using the ACF 7, a metal rod is pressed, and the body 5a of the FPC 5A and the COF 4 are joined to each other by the thermo-compression bonding by using the ACF 7. However, a part of the detour portion 5b1 of the FPC 5A extends in the X-direction and is parallel to the ACF 7, and there is a concern that the part of the detour portion 5b1 can interfere with the metal rod depending on the dimension of the metal rod in the axial direction.

In view of this, the part of the detour portion 5b1 parallel to the ACF 7 related to the thermo-compression bonding is thinner than a compression bonding portion obtained by stacking the ACF 7, the COF 4, and the body 5a of the FPC 5A related to the thermo-compression bonding such that the thermo-compression bonding is not impeded. According to the second embodiment, the thickness of the detour portion 5b1 that extends from the body 5a of the FPC 5A is decreased such that a single-sided wiring is enabled and is less than that of the compression bonding portion obtained by stacking the ACF 7, the COF 4, and the body 5a of the FPC 5A. However, when the detour portion 5b1 of the FPC 5A is too thin, the detour portion 5b1 is likely to bend, and there is a concern, for example, that the detour portion 5b1 is broken and joined during the compression bonding. For example, the thickness of the compression bonding portion obtained by stacking the ACF 7, the COF 4, and the body 5a of the FPC 5A related to the thermo-compression bonding is preferably about 82 μm. For example, the thickness of the detour portion 5b1 of the FPC 5A is preferably about 65 μm.

Third Embodiment

Figure 8:
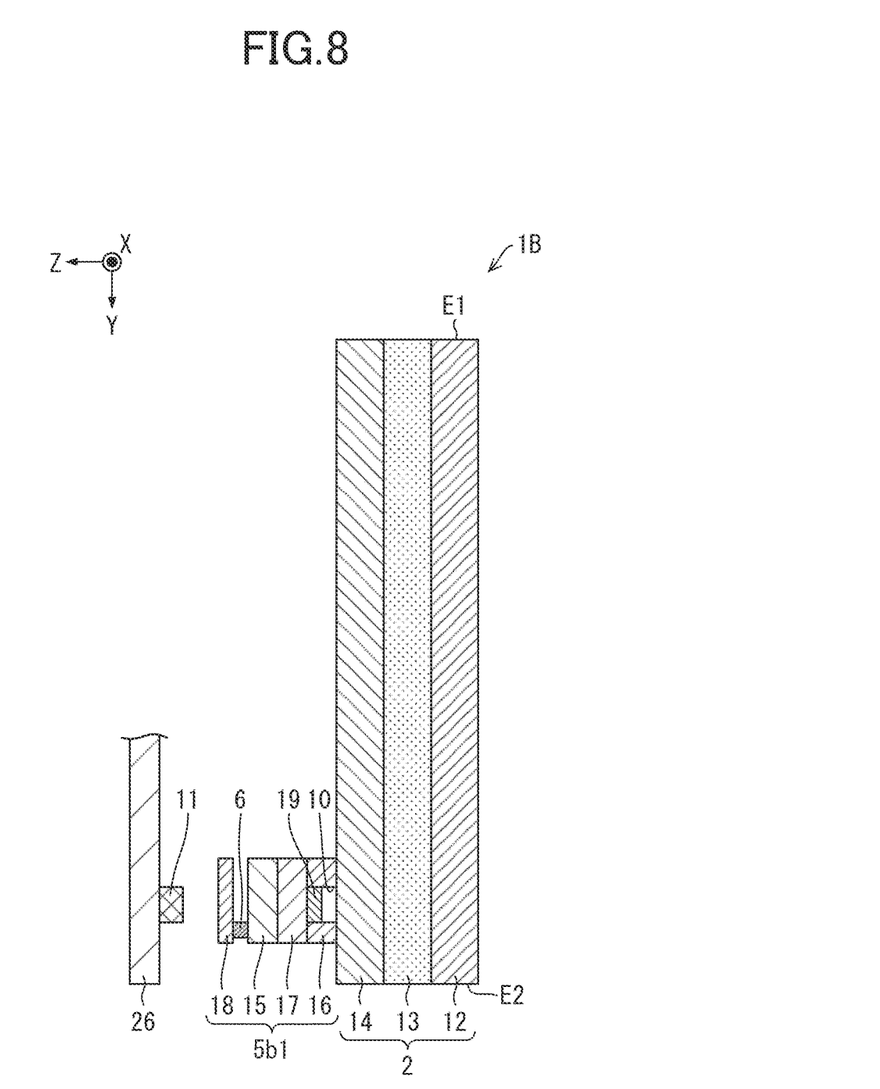
FIG. 8 is a sectional view of the display panel and a detour portion in a self-luminous display device according to a third embodiment.

FIG. 8 is a sectional view of the display panel 2 and the detour portion 5b1 in a self-luminous display device 1B according to a third embodiment. Components like to the components described above are designated by like reference characters, and a detailed description thereof is not repeated.

The thermistor 6 may be located on the opposite side of the detour portion 5b1 from the display panel 2. The detour portion 5b1 of the FPC may extend with the detour portion 5b1 being in contact with the display panel 2.

The detour portion 5b1 may contain a high-thermal-conductivity material for effectively conducting the heat of the display panel 2 to the thermistor 6. The detour portion 5b1 may have an opening 10 for effectively conducting the heat of the display panel 2 to the thermistor 6.

The flexible unit 3 may further include a cushion spring 11 that presses the detour portion 5b1 against the display panel 2. The cushion spring 11 is mounted on a cabinet portion 26 and can be formed, for example, by winding a PET material around high-density urethane foam (the product name: PORON) and by depositing metal.

According to the third embodiment, a contact between the detour portion 5b1 and the display panel 2 has high thermal conductivity. In order to effectively conduct the heat to the thermistor 6, a gold plating portion 19 that has high thermal conductivity is formed in the opening 10 of the cover-lay 16 at which the display panel 2 of the heat source and the detour portion 5b1 are in contact with each other, and the copper portion 17 that has high thermal conductivity is formed between the cover-lay 16 and the base 15. That is, the opening 10 is formed in a part of the cover-lay 16 in the surface layer of the detour portion 5b1 near the contact with the display panel 2, and the copper portion 17 therein and the display panel 2 are in contact with each other. The opening 10 is covered by the gold plating portion 19 such that the copper portion 17 does not corrode.

In this way, the heat is effectively conducted from the display panel 2 to the thermistor 6, and this increases the possibility of detecting the anomalous light emission even from a location away from the anomalous light emission region corresponding to the heat source and also increases the possibility of detecting the anomalous light emission even in the case of low-temperature heat generation.

Fourth Embodiment

Figure 9:
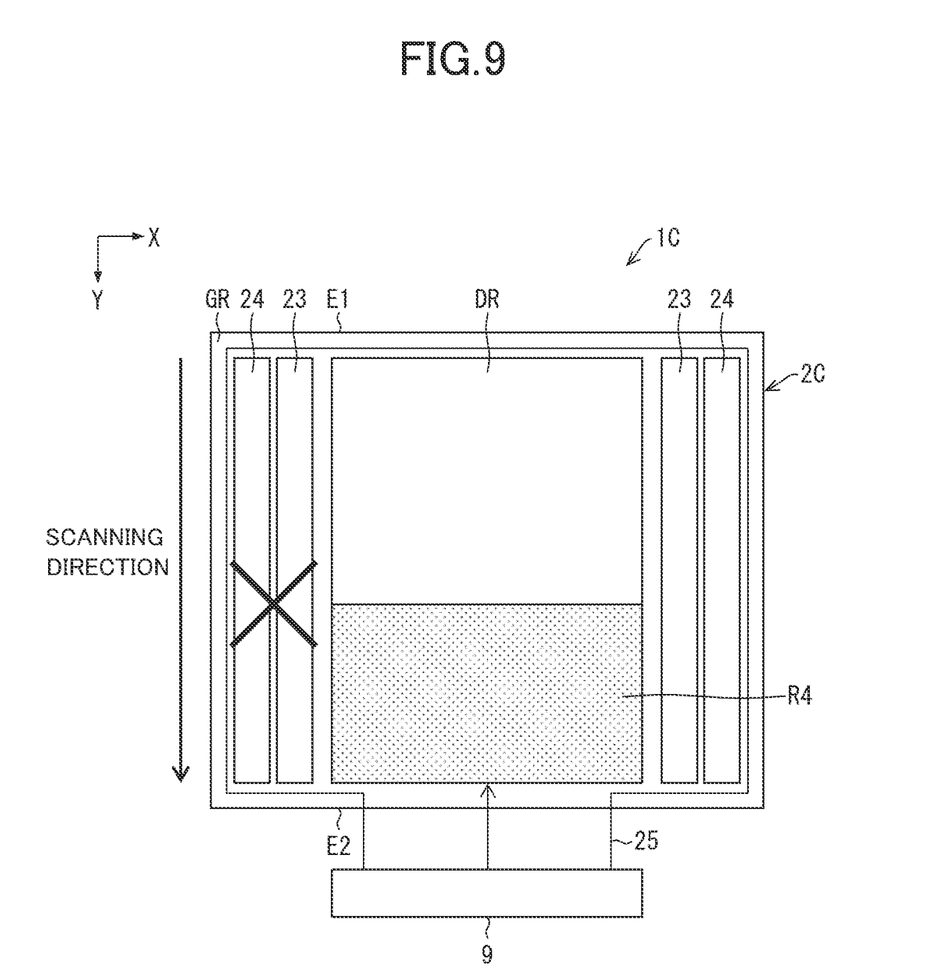
FIG. 9 is a rear view of a display panel and a driver in a self-luminous display device according to a fourth embodiment.
Figure 10:
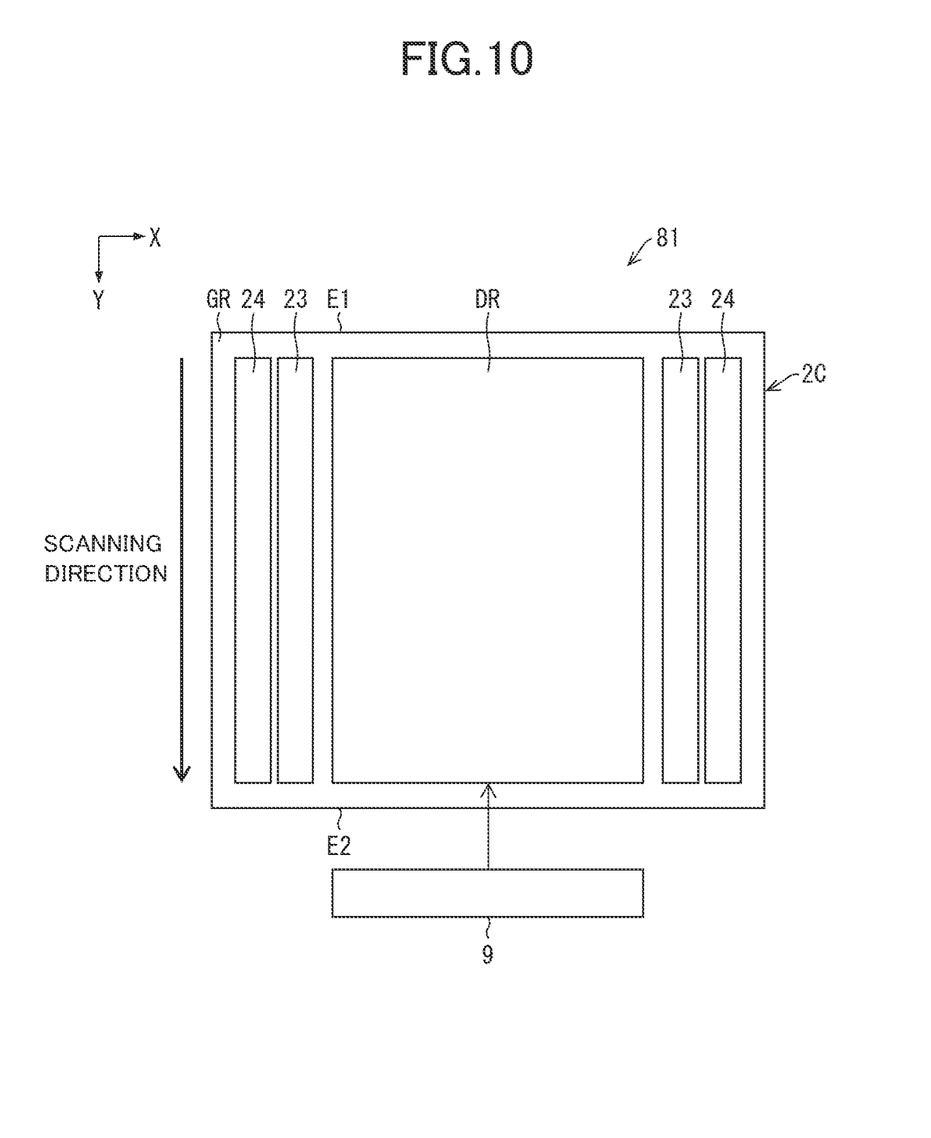
FIG. 10 is a rear view of the display panel and the driver in a self-luminous display device in a comparative example.
Figure 11:
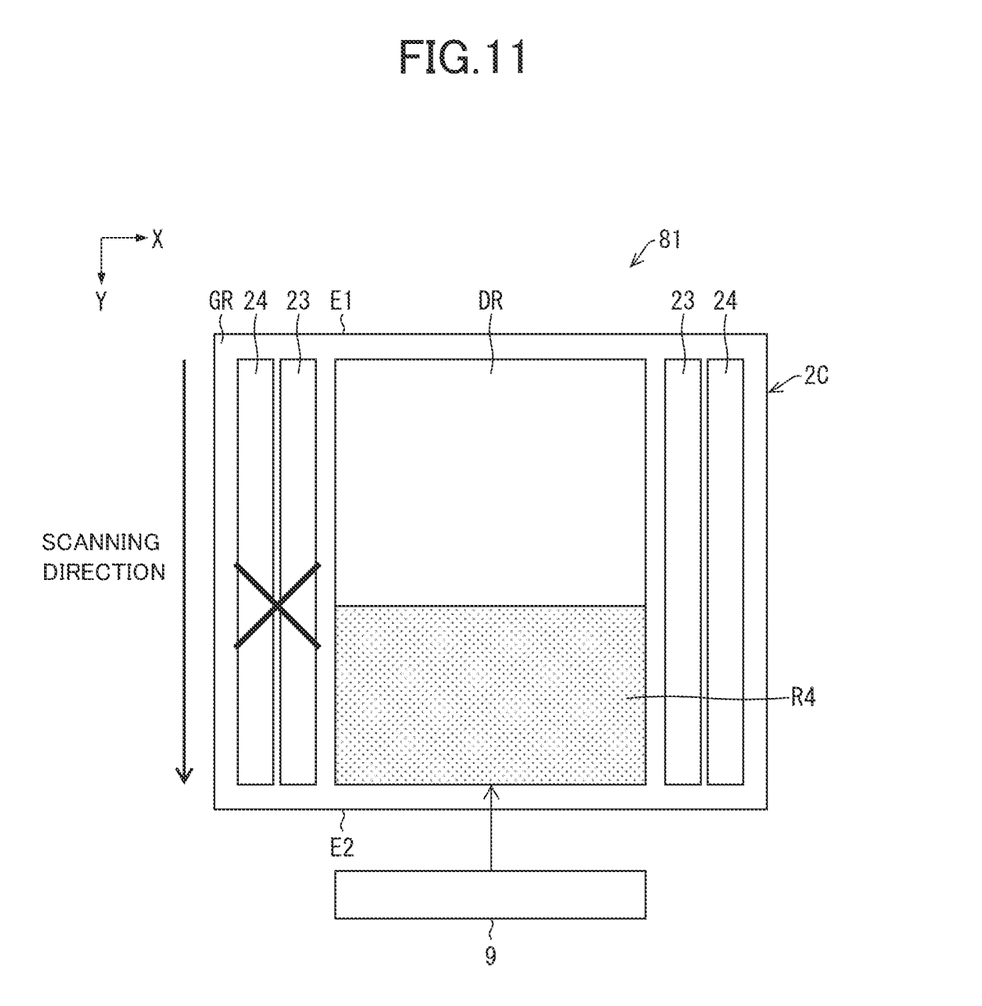
FIG. 11 is a rear view for describing the operation of the self-luminous display device.

FIG. 9 is a rear view of a display panel 2C and the driver 9 in a self-luminous display device 1C according to a fourth embodiment. FIG. 10 is a rear view of the display panel 2C and the driver 9 in a self-luminous display device 81 in a comparative example. FIG. 11 is a rear view for describing the operation of the self-luminous display device 81. Components like to the components described above are designated by like reference characters, and a detailed description thereof is not repeated.

The self-luminous display device 1C includes the display panel 2C that has a display region DR in which the OLEDs are arranged in the X-direction and in the Y-direction and are scanned in the column direction from the first end E1 toward the second end E2 and that has a frame region GR that surrounds the display region DR, and the driver 9 for driving the OLEDs.

In the frame region GR, gate wiring lines 23 that are connected to the driver 9 to supply display data for the light emission of the OLEDs, and control wiring lines 24 through which a control signal for controlling the light emission of the OLEDs is supplied are formed in the Y-direction on both sides of the display region DR.

A loop wiring line 25 is formed along the gate wiring lines 23 and the control wiring lines 24 in the frame region GR so as to surround the display region DR.

Both ends of the loop wiring line 25 are connected to the driver 9. The driver 9 detects the disconnection of the loop wiring line 25 by monitoring the electric resistance of the loop wiring line 25. The driver 9 stops the driving of the OLEDs when the driver 9 detects the disconnection of the loop wiring line 25.

The loop wiring line 25 is thus disposed near and outside or inside the gate wiring lines 23 and the control wiring lines 24 in the frame region GR, which can cause the anomalous light emission of a lower part R4 of the display region DR at the time of the disconnection, and the driver 9 monitors the resistance of the loop wiring line 25.

It is presumed that when the disconnection of the gate wiring line 23 and/or the control wiring line 24 in the frame region GR occurs due to damage during use by a user, the disconnection of the loop wiring line 25 that serves as a check pattern also occurs. For this reason, fail-safe control is implemented, for example, by turning off the OLEDs when the disconnection of the loop wiring line 25 occurs to ensure the safety of the user.

SUMMARY

The self-luminous display device 1, 1A, 1B according to a first aspect of the present disclosure includes the display panel 2 including the self-luminous elements that are arranged in the row direction and in the column direction and that are scanned in the column direction from the first end E1 toward the second end E2, and the flexible unit 3, 3A that is connected to the second end of the display panel 2 in the column direction, that bends, and that extends along the display panel 2. The flexible unit 3, 3A includes the thermistor 6 that detects the temperature of the display panel 2. The flexible unit 3, 3A includes the detour portion 5b, 5b1 that is equipped with the thermistor 6 on the portion that extends in the row direction, that detours, and that extends toward the second end E2 in a plan view.

With the structure described above, the thermistor, which detects the temperature of the display panel including the self-luminous elements that are arranged in the row direction and in the column direction and that are scanned in the column direction from the first end toward the second end, is equipped at the position of the detour portion of the flexible unit that extends in the row direction, that detours, and that extends toward the second end in a plan view. For this reason, the thermistor is located nearer than that in an existing structure to the second end that is located forward in a scanning direction. Accordingly, increase in the temperature of the display panel can be detected with certainty also in the case where the anomalous light emission of the self-luminous elements occurs on the several lines from the final scanning line.

In the self-luminous display device 1, 1A, 1B according to a second aspect of the present disclosure, the flexible unit 3, 3A may further include the chip-on-film (the COF 4) that is equipped with the driver 9 for driving the self-luminous elements, that is connected to the second end E2 of the display panel 2, and that extends along the display panel 2, the flexible printed circuit (the FPC 5) that is joined to the chip-on-film (the COF 4) and that extends along the display panel 2, and the anisotropic conductive film (the ACF 7) for joining the chip-on-film (the COF 4) and the flexible printed circuit (the FPC 5) to each other by thermo-compression bonding. The detour portion may be disposed on the flexible printed circuit. The detour portion 5b, 5b1 may detour around the anisotropic conductive film (the ACF 7) and may extend toward the second end E2. The detour portion 5b, 5b1 may be equipped with the thermistor 6 at a position nearer than the anisotropic conductive film (the ACF 7) to the second end E2 in a plan view in the above first aspect.

With the structure described above, the thermistor further approaches the second end that is located forward in the scanning direction.

In the self-luminous display device 1, 1A, 1B according to a third aspect of the present disclosure, the thermistor 6 may be located at a position a predetermined distance away from the second end E2 in the above first or second aspect.

The reason is that there is a possibility that the second end of the display panel and the cabinet frame into which the display panel is incorporated come into contact with each other when the thermistor is located substantially at the second end. Another reason is that in the case where the anomalous light emission occurs in a narrow region, the heat that is generated by the display panel does not reach a temperature that can be detected by the thermistor because of the heat dissipation from the display panel to the outside. Specifically, the reason is that the thermistor is disposed on the surface of the display panel at the second end that adheres to the cabinet frame, and the incorporation of the display panel into the cabinet is impeded by the thermistor.

In the self-luminous display device 1A according to a fourth aspect of the present disclosure, the thickness of the detour portion 5b, 5b1 may be less than the total thickness of the thickness of the anisotropic conductive film (the ACF 7), the thickness of the chip-on-film (the COF 4), and the thickness of the flexible printed circuit (the FPC 5) in the above second or third aspect.

With the structure described above, the possibility that the metal rod that is used in the process of thermo-compression bonding of the flexible printed circuit and the chip-on-film by using the anisotropic conductive film interferes with the part of the detour portion is eliminated.

In the self-luminous display device 1B according to a fifth aspect of the present disclosure, the flexible printed circuit (the FPC 5) may extend with the flexible printed circuit being in contact with the display panel 2 and may contain a high-thermal-conductivity material for conducting the heat of the display panel 2 to the thermistor 6 in any one of the above second to fourth aspects.

With the structure described above, the flexible printed circuit contains the high-thermal-conductivity material, and the thermistor can detect the increase in the temperature of the display panel with more certainty.

In the self-luminous display device 1B according to a sixth aspect of the present disclosure, the flexible printed circuit (the FPC 5) may extend with the flexible printed circuit being in contact with the display panel 2 and may have the opening 10 for conducting the heat of the display panel 2 to the thermistor 6 in any one of the above second to fifth aspects.

With the structure described above, the flexible printed circuit has the opening for effectively conducting the heat of the display panel to the thermistor 6, and the thermistor can detect the increase in the temperature of the display panel with more certainty.

In the self-luminous display device 1B according to a seventh aspect of the present disclosure, the thermistor 6 may be located on the opposite side of the detour portion 5*b*, 5*b*1 from the display panel 2, the flexible printed circuit (the FPC 5) may extend with the flexible printed circuit being in contact with the display panel 2, and the flexible unit 3 may further include the cushion spring 11 that presses the flexible printed circuit (the FPC 5) against the display panel 2 in any one of the above second to sixth aspects.

With the structure described above, the flexible unit further includes the cushion spring that presses the flexible printed circuit against the display panel, and the thermistor can detect the increase in the temperature of the display panel with more certainty.

The present disclosure is not limited to the embodiments described above, various modifications can be made within the scope of Claims, and an embodiment obtained by appropriately combining technical measures disclosed according to the different embodiments is also included in the technical scope of the present disclosure. A combination of the technical measures disclosed in the embodiments can form a new technical feature.

While there have been described what are at present considered to be certain embodiments of the invention, it will be understood that various modifications may be made thereto, and it is intended that the appended claims cover all such modifications as fall within the true spirit and scope of the invention.

The present disclosure contains subject matter related to that disclosed in Japanese Priority Patent Application JP 2020-009379 filed in the Japan Patent Office on Jan. 23, 2020, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A self-luminous display device comprising:
    a display panel including self-luminous elements that are arranged in a row direction and in a column direction and that are scanned in the column direction from a first end toward a second end; and
    a flexible unit that is connected to the second end of the display panel in the column direction, that bends, and that extends along the display panel,
    wherein the flexible unit includes a thermistor that detects a temperature of the display panel, and
    wherein the flexible unit includes a detour portion that is equipped with the thermistor on a portion that extends in the row direction, that detours, and that extends toward the second end in a plan view.

2. The self-luminous display device according to claim 1, wherein the flexible unit further includes a chip-on-film that is equipped with a driver for driving the self-luminous elements, that is connected to the second end of the display panel, and that extends along the display panel, a flexible printed circuit that is joined to the chip-on-film and that extends along the display panel, and an anisotropic conductive film for joining the chip-on-film and the flexible printed circuit to each other by thermo-compression bonding,
    wherein the detour portion is disposed on the flexible printed circuit,
    wherein the detour portion detours around the anisotropic conductive film and extends toward the second end, and
    wherein the detour portion is equipped with the thermistor at a position nearer than the anisotropic conductive film to the second end in a plan view.

3. The self-luminous display device according to claim 2, wherein a thickness of the detour portion is less than a total thickness of a thickness of the anisotropic conductive film, a thickness of the chip-on-film, and a thickness of the flexible printed circuit.

4. The self-luminous display device according to claim 2, wherein the flexible printed circuit extends with the flexible printed circuit being in contact with the display panel and contains a high-thermal-conductivity material for conducting heat of the display panel to the thermistor.

5. The self-luminous display device according to claim 2, wherein the flexible printed circuit extends with the flexible printed circuit being in contact with the display panel and has an opening for conducting heat of the display panel to the thermistor.

6. The self-luminous display device according to claim 2, wherein the thermistor is located on an opposite side of the detour portion from the display panel,
    wherein the flexible printed circuit extends with the flexible printed circuit being in contact with the display panel, and
    wherein the flexible unit further includes a cushion spring that presses the flexible printed circuit against the display panel.

7. The self-luminous display device according to claim 1, wherein the thermistor is located at a position a predetermined distance away from the second end.

\* \* \* \* \*